US010809570B2

(12) United States Patent
Ji et al.

(10) Patent No.: US 10,809,570 B2
(45) Date of Patent: Oct. 20, 2020

(54) METHOD FOR ACQUIRING BACKLIGHT DIFFUSION TRANSMISSION PARAMETER, DISPLAY CONTROL METHOD AND DISPLAY CONTROL DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Zhihua Ji, Beijing (CN); Tiankuo Shi, Beijing (CN); Xiaomang Zhang, Beijing (CN); Yilang Sun, Beijing (CN); Yanhui Xi, Beijing (CN); Yifang Chu, Beijing (CN); Lingyun Shi, Beijing (CN); Chuanjun Liu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/244,649

(22) Filed: Jan. 10, 2019

(65) Prior Publication Data
US 2019/0353961 A1 Nov. 21, 2019

(30) Foreign Application Priority Data

May 18, 2018 (CN) .......................... 2018 1 0480444

(51) Int. Cl.
G09G 3/36 (2006.01)
G02F 1/13357 (2006.01)
G09G 3/34 (2006.01)

(52) U.S. Cl.
CPC .. *G02F 1/133611* (2013.01); *G02F 1/133603* (2013.01); *G02F 1/133606* (2013.01); *G09G 3/3406* (2013.01)

(58) Field of Classification Search
CPC ......... G02F 1/133611; G02F 1/133606; G02F 1/133603; G09G 3/3406; G09G 3/3426; G09G 2360/145; G09G 3/36
See application file for complete search history.

(56) References Cited

U.S. PATENT DOCUMENTS

2009/0189543 A1  7/2009  Yeo et al.
2010/0245397 A1  9/2010  Choe et al.
(Continued)

FOREIGN PATENT DOCUMENTS

CN   101494025 A   7/2009
CN   101689350 A   3/2010
(Continued)

OTHER PUBLICATIONS

First Office Action for Chinese Application No. 201810480444.8, dated Jun. 17, 2020, 12 Pages.

*Primary Examiner* — Adam R. Giesy
(74) *Attorney, Agent, or Firm* — Brooks Kushman P.C.

(57) ABSTRACT

A method for acquiring backlight diffusion transmission parameter, a display control method and a display control device are provided. The method includes: selecting a plurality of backlight sources respectively arranged at different backlight regions of a display device and measuring a light diffusion data for each of the plurality of backlight sources, where the light diffusion data includes luminance values of a plurality of pixel points of a screen of the display device and a distance between a position of each pixel point and a position of a certain backlight source of the plurality of backlight sources in the case that only the certain backlight source is turned on; preprocessing the light diffusion data to determine effective pixel points of the plurality of pixel points; fitting the light diffusion data of the effective pixel points, to obtain a point spread function $y=f(x)$ indicating a relationship between y representing a diffusion luminance (Continued)

value and x representing a diffusion distance, where y representing a diffusion luminance value is a luminance value of each pixel point, and x representing a diffusion distance is a distance between a position of the each pixel point and a position of a certain backlight source of the plurality of backlight sources; and determining the point spread function $y=f(x)$ as the backlight diffusion transmission parameter.

14 Claims, 6 Drawing Sheets

(56) References Cited

U.S. PATENT DOCUMENTS

| | | | |
|---|---|---|---|
| 2010/0289833 | A1 | 11/2010 | Budzelaar et al. |
| 2011/0227900 | A1* | 9/2011 | Wallener ............ G09G 3/3413 345/211 |
| 2011/0279485 | A1 | 11/2011 | Jang et al. |

FOREIGN PATENT DOCUMENTS

| | | | |
|---|---|---|---|
| CN | 101847369 | A | 9/2010 |
| CN | 102243388 | A | 11/2011 |
| CN | 102930831 | A | 2/2013 |
| CN | 103295553 | A | 9/2013 |
| CN | 104637455 | A | 5/2015 |
| CN | 107507580 | A | 12/2017 |
| CN | 107610654 | A | 1/2018 |

\* cited by examiner

METHOD FOR ACQUIRING BACKLIGHT DIFFUSION TRANSMISSION PARAMETER, DISPLAY CONTROL METHOD AND DISPLAY CONTROL DEVICE

CROSS-REFERENCE TO RELATED APPLICATION

This application claims priority to Chinese Patent Application No. 201810480444.8 filed on May 18, 2018, which is incorporated herein by reference in its entirety.

TECHNICAL FIELD

The present disclosure relates to the field of display technology, and in particular to a method for acquiring backlight diffusion transmission parameter, a display control method and a display control device.

BACKGROUND

A light source of a liquid crystal device is a backlight module. In the related art, a uniform backlight is provided, and the liquid crystals are controlled to be rotated to realize a gray scale control of an output image. At recent years, along with an improvement of a control calculation capability and the technology, a local dimming technology is introduced. By darkening the backlight for the dark regions of the image and compensating the display signal of the liquid crystal display (LCD) device through a display control, so as to achieve the display effect the same with that in the case of full luminance backlight, thereby reducing the power consumption of the backlight and improving the contract of the image. The local dimming is particularly applicable to the display device powered by a battery such as mobile phone and wearable device.

The local dimming technology is applicable to the direct-type backlight liquid crystal display device of which the backlight light source is the light emitting diode (LED). However, after the local dimming, the luminance of respective backlight sources are quite different from each other, and it is unable to effectively compensate the backlight by the LCD compensation image in the related art, and the final display effect may be adversely affected.

SUMMARY

A method for acquiring a backlight diffusion transmission parameter is provided in the present disclosure, including:

selecting a plurality of backlight sources respectively arranged at different backlight regions of a display device and measuring a light diffusion data for each of the plurality of backlight sources, where the light diffusion data includes luminance values of a plurality of pixel points of a screen of the display device and a distance between a position of each pixel point and a position of a certain backlight source of the plurality of backlight sources in the case that only the certain backlight source is turned on;

preprocessing the light diffusion data to determine effective pixel points of the plurality of pixel points;

fitting the light diffusion data of the effective pixel points, to obtain a point spread function $y=f(x)$ indicating a relationship between y representing a diffusion luminance value and x representing a diffusion distance, where y representing a diffusion luminance value is a luminance value of each pixel point, and x representing a diffusion distance is a distance between a position of the each pixel point and a position of a certain backlight source of the plurality of backlight sources; and determining the point spread function $y=f(x)$ as the backlight diffusion transmission parameter.

Optionally, the preprocessing the light diffusion data to determine the effective pixel points of the plurality of pixel points further includes:

removing the light diffusion data of the pixel points of which the luminance values are smaller than a first luminance threshold, and selecting the pixel points of which the luminance values are greater than or equal to the first luminance threshold as the effective pixel points.

Optionally, the luminance values of the plurality of pixel points of the screen of the display device and the distance between the position of each pixel point and the position of the certain backlight source of the plurality of backlight sources in the case that only the certain backlight source is turned on includes:

the diffusion luminance value and the diffusion distance of each of the pixel points at different distances from the position of the certain backlight source in a horizontal direction and a vertical direction.

Optionally, the point spread function $y=f(x)$ is a piecewise polynomial function as:

$$f(x) = \begin{cases} \sum_{n=0}^{k} a_n x^n & 0 \le x \le d1 \\ \sum_{n=0}^{k} b_n x^n & d1 < x \le d2 \end{cases}$$

where k represents a polynomial order, $a_n$ and $b_n$ represent coefficients of respective terms, d1 represents a decomposition distance of the piecewise polynomial function, d2 represents a maximum diffusion distance representing a distance between a backlight source and an effective pixel point farthest from the backlight source, x represents the diffusion distance, and y represents the diffusion luminance value.

Optionally, the d1 representing a decomposition distance of the piecewise polynomial function is determined based on a division of the backlight regions of the display device.

Optionally, the fitting the light diffusion data of the effective pixel points, to obtain the point spread function $y=f(x)$ indicating the relationship between y representing a diffusion luminance value and x representing a diffusion distance further includes:

performing a statistic analysis to the light diffusion data of the effective pixel points, to obtain a mean value of the diffusion luminance values corresponding to each diffusion distance and determining the mean value as a mean diffusion luminance value of the each diffusion distance; and performing a curve-fitting to a relationship data of the mean diffusion luminance value and the each diffusion distance, to obtain the point spread function $y=f(x)$.

Optionally, the position of each pixel point is a coordinate position of the each pixel point at the screen of the display device, and the position of the certain backlight source of the plurality of backlight sources is a coordinate position of the pixel point corresponding to a center point of the certain backlight source at the screen of the display device.

A method for detecting a backlight diffusion luminance is further provided in the present disclosure, including:

determining, based on a distance between a position of a pixel point and each backlight source of a plurality of backlight sources and a backlight diffusion transmission parameter, a backlight diffusion luminance value of each backlight source at the position of the pixel point, where the backlight diffusion transmission parameter is acquired based on the method hereinabove.

A display control method is further provided in the present disclosure, including:

setting a set backlight luminance value of each of a plurality of backlight regions based on a gray scale of an image to be displayed;

acquiring a backlight diffusion transmission parameter of a backlight circuit of a display device;

calculating, based on the set backlight luminance value of each of the plurality of backlight regions and the backlight diffusion transmission parameter, an equivalent backlight luminance value of each of a plurality of pixel points;

acquiring a compensation image based on the equivalent backlight luminance value of each of the plurality of pixel points; and controlling the backlight circuit to enable backlight sources to emit light at the set backlight luminance value of each of the plurality of backlight regions and controlling a liquid crystal panel to display an image based on the compensation image;

where the backlight diffusion transmission parameter of the backlight circuit of the display device is acquired based on the method hereinabove and stored in the display device.

Optionally, the calculating, based on the set backlight luminance value of each of the plurality of backlight regions and the backlight diffusion transmission parameter, the equivalent backlight luminance value of each of the plurality of pixel points further includes:

determining, through the point spread function $y=f(x)$, A×B effective backlight sources affecting a luminance of each pixel point of the plurality of pixel points, where A and B are positive integers;

acquiring, through using the point spread function $y=f(x)$ based on a distance between the each pixel point and each of the A×B effective backlight sources, a total diffusion luminance value of the A×B effective backlight sources at the each pixel point and taking the total diffusion luminance value as the equivalent backlight luminance value $BL_{equ}$ of the each pixel point, where $$BL_{equ} = \sum_{i=1}^{A}\sum_{j=1}^{B} f(x_{i,j})L_{i,j},$$

where $x_{i,j}$ represents the distance between each pixel point and each of the A×B effective backlight sources, $f(x_{i,j})$ represents a diffusion weight of each of the A×B effective backlight sources for the each pixel point, and $L_{i,j}$ represents a luminance reference value of each of the A×B effective backlight sources;

determining the A×B effective backlight sources of each pixel point and the diffusion weight of each of the A×B effective backlight sources for the each pixel point as the backlight diffusion transmission parameter and storing the backlight diffusion transmission parameter; and calculating the equivalent backlight luminance value of each of the plurality of pixel points, based on the A×B effective backlight sources of each pixel point, the diffusion weight of each of the A×B effective backlight sources for the each pixel point and the set backlight luminance value of each of the plurality of backlight regions.

Optionally, the method further includes:

performing a weighting normalization to a calculation formula of the equivalent backlight luminance value of each of the plurality of pixel points, where a formula of calculating a weigh sum is $$\text{sum\_weight} = \sum_{i=1}^{A}\sum_{j=1}^{B} f(x_{i,j}),$$

a formula of calculating a normalized weight is $\text{weight}(i,j) = f(x_{i,j})/\text{sum\_weight}$; and determining the normalized weight as the backlight diffusion transmission parameter and storing the backlight diffusion transmission parameter, to calculate equivalent backlight luminance value.

A display control device applied to a direct-type backlight liquid crystal display device having a plurality of adjustable backlight regions is further provided in the present disclosure, including:

an image acquisition circuit, configure to acquire an image to be displayed;

a backlight setting circuit, configured to set a set backlight luminance value of each of the plurality of backlight regions based on a gray scale of the image to be displayed;

a backlight diffusion transmission parameter acquisition circuit, configure to acquire a backlight diffusion transmission parameter of a backlight circuit of a display device;

an equivalent backlight luminance calculation circuit, configured to calculate an equivalent backlight luminance value of each of a plurality of pixel points based on the set backlight luminance value of each of the plurality of backlight regions and the backlight diffusion transmission parameter;

a compensation image calculation circuit, configured to acquire a compensation image based on the equivalent backlight luminance value of each of the plurality of pixel points; and a control signal output circuit, configured to output a control signal to control the backlight circuit to enable backlight sources to emit light at the set backlight luminance value of each of the plurality of backlight regions and control a liquid crystal panel to display an image based on the compensation image;

where the backlight diffusion transmission parameter of the backlight circuit of the display device is acquired based on the method hereinabove and stored in the display device.

Optionally, the backlight diffusion transmission parameter includes a point spread function $y=f(x)$ indicating a relationship between y representing a diffusion luminance value and x representing a diffusion distance, and the equivalent backlight luminance calculation circuit is further configured to:

determine, through the point spread function $y=f(x)$, A×B effective backlight sources affecting a luminance of each pixel point of the plurality of pixel points, where A and B are positive integers;

acquire, through using the point spread function $y=f(x)$ based on a distance between the each pixel point and each of the A×B effective backlight sources, a total diffusion luminance value of the A×B effective backlight sources at the each pixel point and take the total diffusion luminance value as the equivalent backlight luminance value $BL_{equ}$ of the each pixel point, where $$BL_{equ} = \sum_{i=1}^{A}\sum_{j=1}^{B} f(x_{i,j})L_{i,j},$$

where $x_{i,j}$ represents the distance between the each pixel point and each of the A×B effective backlight sources, $f(x_{i,j})$ represents a diffusion weight of each of the A×B effective backlight sources for the each pixel point, and $L_{i,j}$ represents a luminance reference value of each of the A×B effective backlight sources;

determine the A×B effective backlight sources of each pixel point and the diffusion weight of each of the A×B effective backlight sources for the each pixel point as the backlight diffusion transmission parameter and store the backlight diffusion transmission parameter; and calculate the equivalent backlight luminance value of each of the plurality of pixel points, based on the A×B effective backlight sources of each pixel point, the diffusion weight of each of the A×B effective backlight sources for the each pixel point and the set backlight luminance value of each of the plurality of backlight regions.

Optionally, the equivalent backlight luminance calculation circuit is further configured to:

perform a weighting normalization to a calculation formula of the equivalent backlight luminance value of each of the plurality of pixel points, where a formula of calculating a weigh sum is $$\text{sum\_weight} = \sum_{i=1}^{A}\sum_{j=1}^{B} f(x_{i,j}),$$

a formula of calculating a normalized weight is weight(i,j)= $f(x_{i,j})$/sum_weight; and determine the normalized weight as the backlight diffusion transmission parameter and store the backlight diffusion transmission parameter, to calculate equivalent backlight luminance value.

A display device is further provided in the present disclosure, including a direct-type backlight circuit, a display panel, a computer-readable storage medium and a processor, where the processor is configured to read a program stored in the computer readable storage medium to perform the display control method hereinabove.

DETAILED DESCRIPTION

Figure 1:
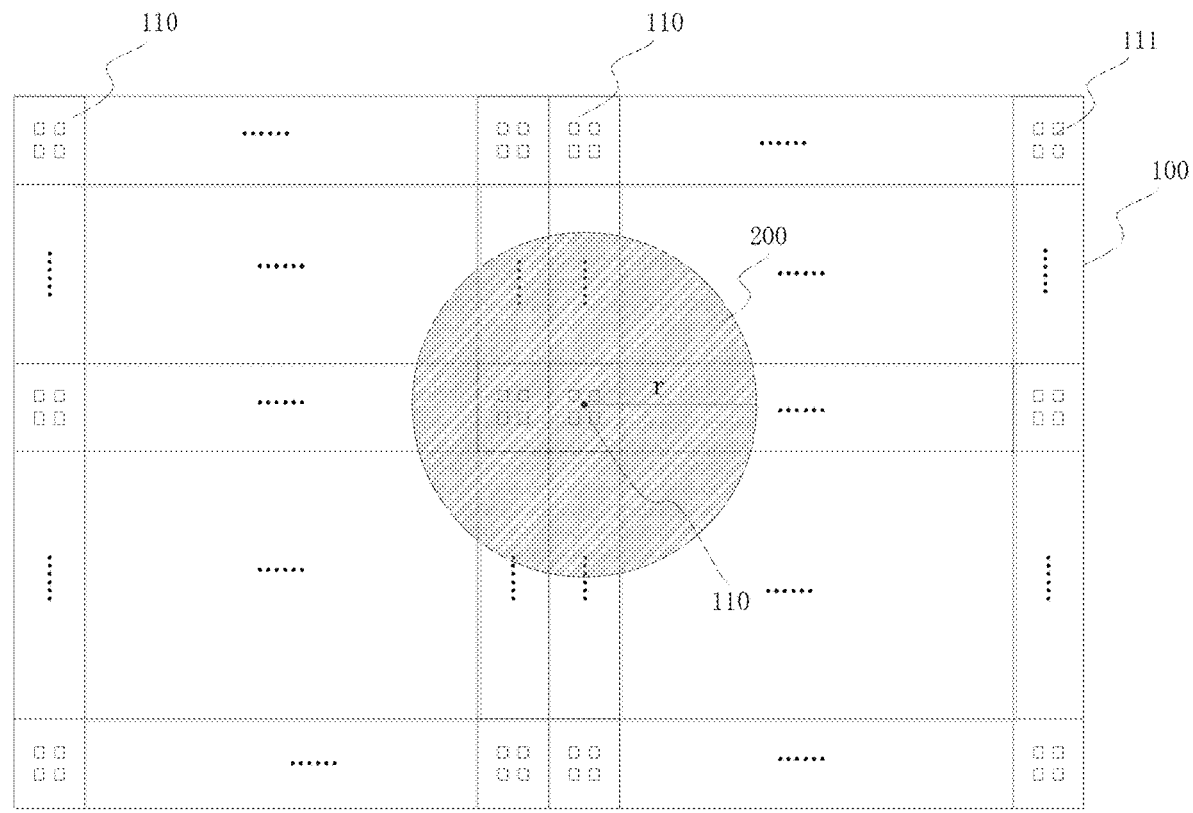
FIG. 1 is a schematic view of an arrangement of backlight sources of a direct-type backlight circuit in some embodiments of the present disclosure.

In order to make the present disclosure more clearly, the present disclosure will be further described in detail below in conjunction with the preferred embodiments and drawings. In the following detailed description, numerous specific details are set forth. However, one skilled in the art should understand that one or more embodiments can be implemented without specific details. In other instances, well-known structures and devices are shown in the drawings in the drawings. It should be noted that the word "comprising" does not exclude other components or steps. The word "a" or "an" does not exclude a plurality.

The local dimming technology is mainly applied to the display device with a direct-type backlight lattice, which adjusts the luminance of respective backlight regions to reduce the backlight power consumption and improving the contract of the image. In the related art, the backlight luminance is directly determined based on the gray scale of the display image and then a LCD display compensation is performed based on the luminance of the backlight regions wherein the pixel is located. In the backlight circuit in the related art, a resolution ratio of the backlight region is significantly lower than the display resolution ratio. The backlight region of each backlight source includes a plurality of pixels, and the influences on the luminance of different pixels are different. In addition, the light emitted by a certain backlight source not only illuminates the region of the certain backlight source, but also influence the luminance of the adjacent regions. In the case of uniform backlight, because the luminance of the backlight is high, so a similar uniform high-luminance backlight of the entire screen may be realized. However, after a local diming process is performed, the luminance of the backlight sources may be significantly different from each other, so it is required to perform a precise modeling to the diffusion transmission of the backlight sources to compensate the LCD display image so as to achieve an expected display effect.

FIG. 1 is a schematic view of an arrangement of backlight sources of a direct-type backlight circuit in some embodiments of the present disclosure. In the backlight circuit, the backlight range of the entire display panel may be divided into a plurality of backlight regions 110, e.g., M×N backlight regions 110. Due to the size of the LED and the control and heating thereof, in the display device in the related art, the resolution ration of the backlight region is significantly lower than the pixel resolution ratio of the display panel. For example, the pixel resolution ratio may reach a magnitude of 100 or even 1000, while the M and N are only at a magnitude of 10. Each backlight region includes a backlight source 111. The backlight source may be a LED or other light emitting components. In the related art, the backlight source generally consists of a plurality of LEDs.

For each backlight source, the light diffusion range is commonly larger than the current backlight region and may further cover other adjacent backlight regions. The diffusion intensity and range of the backlight source are determined based on a size, an optical structure and a material of the backlight source. For a certain type of display device, once the structure and material of the backlight source and the light guide panel/film are determined, the products of this type may have a minor difference there between, and may be described by the same function. In most cases, the diffusion of the backlight is isotropous.

In the case that the light emitting components forming each backlight source have the same luminance and are arranged in a center symmetry manner, all the light emitting components forming the backlight sources may be abstracted to a point light source at the center of the backlight region, so as to facilitate the modeling and calculation. At this time, the diffusion range of the backlight sources may be similar to a circular region. For example, the shadow region 200 with a diffusion region radius r at the center, as shown in FIG. 1. It should be noted that, when the arrangement of the light emitting components of respective backlight sources are different, the diffusion range of the back light source 110 may be of other shapes, e.g., the backlight source consisting of 2×2 LEDs arranged in a central symmetry manner may have a circular diffusion range, and the backlight source consisting of 2×3 LEDs arranged in a rectangle may have an oval diffusion range. In the present disclosure, a circular diffusion range is only for illustration, but not to limit the present disclosure.

Figure 2:
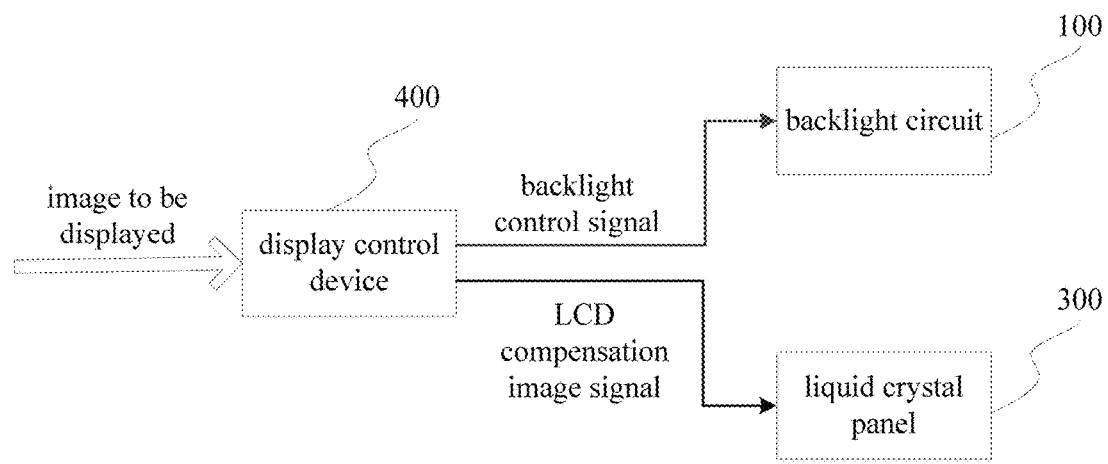
FIG. 2 is a schematic view of a display control principle of a local dimming display device in some embodiments of the present disclosure.

FIG. 2 is a schematic view of a display control principle of a local dimming display device in some embodiments of the present disclosure. When performing a local diming process, the display control device 400 receives the image to be displayed and then generates a backlight control signal and a LCD image compensation signal. The backlight control signal may be generated based on gray scale distribution characteristic of the image to be displayed, so as to control the backlight regions to provide different luminance. When the backlight luminance is changed, the image signal of the liquid crystal panel may be compensated to achieve a target display effect. The compensation process may be performed in consideration of a change of the backlight luminance of the pixel point relative to the static high-luminance backlight.

The backlight of a certain pixel point is not only affected by the backlight region opposite to the certain pixel point but also affected by the adjacent backlight regions. In addition, at different distances from the backlight source, the diffusion of the luminance is not linear. If the backlight diffusion transmission parameter is not modeled precisely, an appropriate LCD compensation image cannot be acquired, which may adversely affect the final image display quality. In view of this, the present disclosure is to model the backlight diffusion transmission parameter through a point spread function and to provide a method of acquiring the backlight diffusion transmission parameter by acquiring the model parameters through a backlight lightening experiment.

The change of the luminance of the backlight source along with diffusion distance may be described by a point spread function (PSF). In an optical system, the point spread function is used to describe an optical field distribution of a point light source. In the related art, the PSF of the backlight source is not used in a local diming display control and accordingly a method of acquiring the PSF of the backlight source is not provided. In the present disclosure, the backlight diffusion weight is calculated based on the distance to the pixel to simulate the diffusion of the backlight source. By turning on the light sources respectively for many times and processing the screen data, a diffusion range of the backlight sources of a backlight region is acquired and the diffusion weights at different distances from the center of the backlight source are acquired. In the following display control process, it is able to calculate the equivalent backlight luminance value of each pixel point based on the diffusion weights and then acquire the precise LCD image compensation value based on the luminance equivalence relation or the like.

Figure 3:
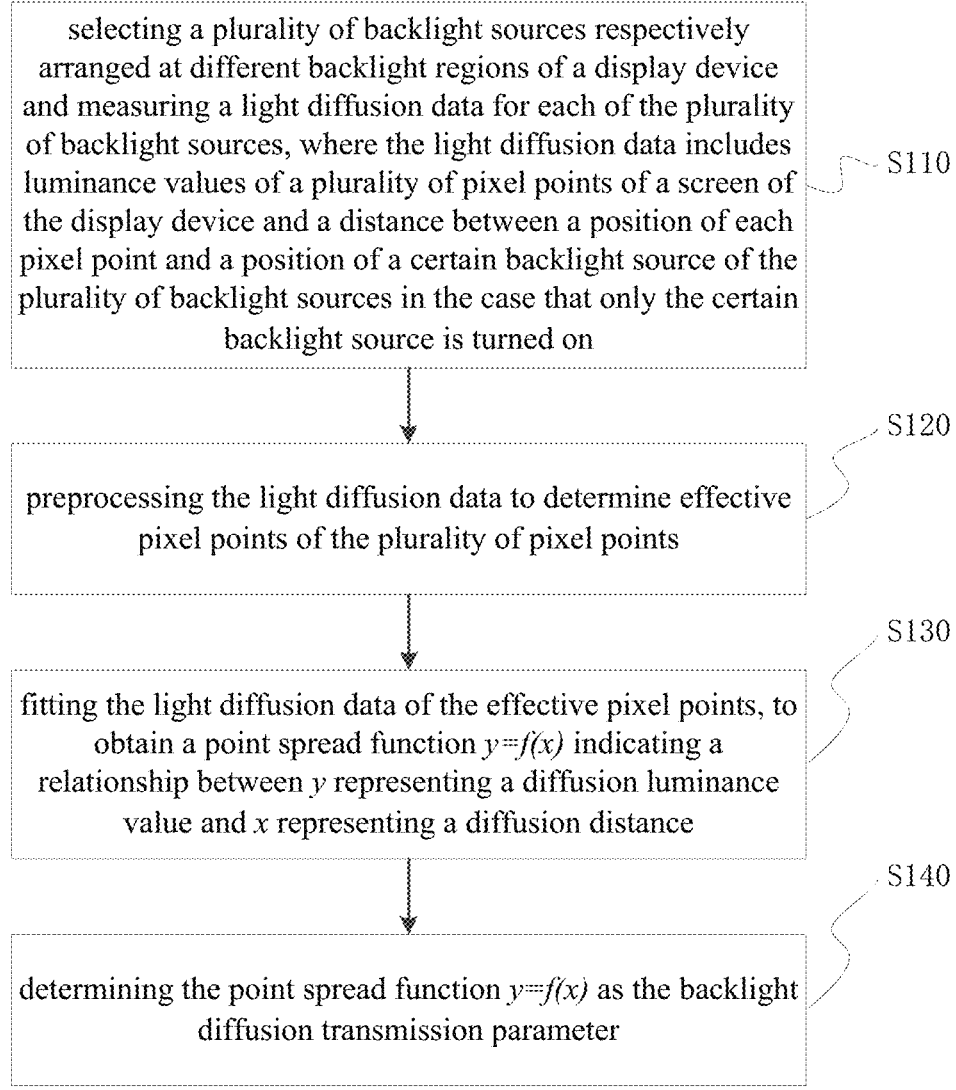
FIG. 3 is a flow chart of a method for acquiring a backlight diffusion transmission parameter in some embodiments of the present disclosure.

FIG. 3 is a flow chart of a method for acquiring a backlight diffusion transmission parameter in some embodiments of the present disclosure. The method includes Steps 110 to 140.

Step 110: selecting a plurality of backlight sources respectively arranged at different backlight regions of a display device and measuring a light diffusion data for each of the plurality of backlight sources, where the light diffusion data includes luminance values of a plurality of pixel points of a screen of the display device and a distance between a position of each pixel point and a position of a certain backlight source of the plurality of backlight sources in the case that only the certain backlight source is turned on, where the position of each pixel point is a coordinate position of the each pixel point at the screen of the display device, and the position of the certain backlight source of the plurality of backlight sources is a coordinate position of the pixel point corresponding to a center point of the certain backlight source at the screen of the display device.

Figure 4:
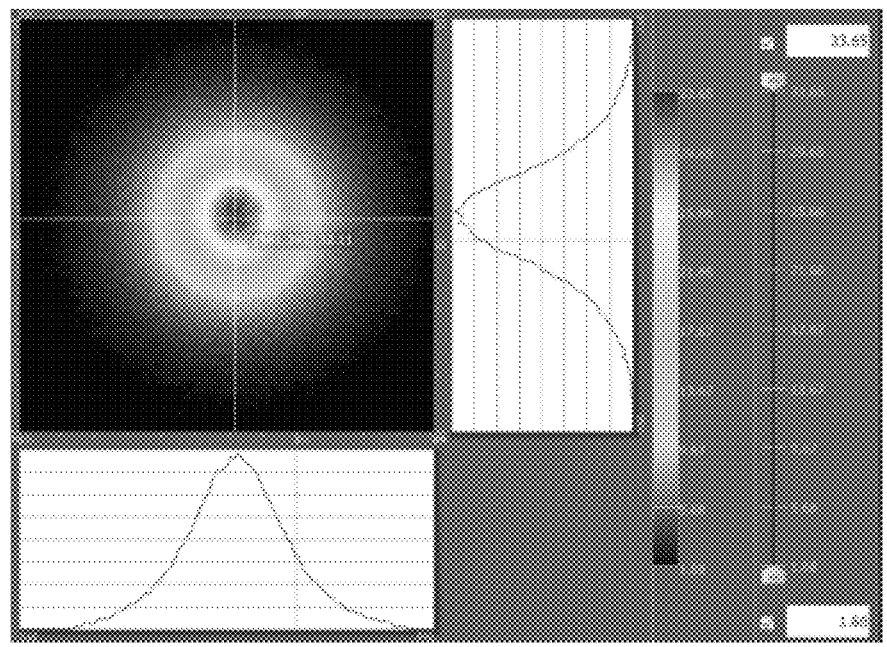
FIG. 4 is a schematic view of a software interface of a software for acquiring luminance data of a luminance acquisition device in some embodiments of the present disclosure.

The measurement of luminance may be implemented by various luminance measurement devices in the related art such as the two-dimensional color analyzer CA2000. For example, FIG. 4 is a schematic view of a software interface of the two-dimensional color analyzer CA2000. By shooting the screen, it is able to acquire a maximum diffusion distance and a maximum diffusion intensity of backlight sources at a backlight region. When measuring the light diffusion data, the display gray scale of the display device may be set to 225, which is equivalent to that a single backlight source is controlled to be turned on by the backlight control signal, and the LCD image signal is used to control the image with the gray scale of 225. In this state, the final luminance appearance of the backlight source is measured, thereby including the structure of the display device, the characteristics of the light guide plate/film into the established model and final embodied in the backlight diffusion transmission parameter.

In order to make the acquired data to better reflect the entire state of the display screen. In some embodiments of the present disclosure, the backlight resource at different backlight regions may be arranged at the center, the upper left, the upper right, the lower left and the lower right regions of the backlight region. For example, 5 backlight sources arranged respectively at the above 5 regions may be selected to be measured. Obviously, the backlight sources at other regions and other numbers of backlight sources may be selected. The more the backlight sources measured, the more accurate the acquired data is. Accordingly, the times of the experiment and the calculation amount of the data processing may be increased.

When describing the diffusion distance, a pixel distance between the position of the pixel point and the backlight source may be used. Therefore, when acquiring the light diffusion data of the backlight source, in order to facilitate the calculation of the pixel distance, it is able to select the pixel point at an integer pixel distance from the pixel point corresponding to the center of the backlight source. For example, the luminance values of the plurality of pixel points of the screen of the display device and the distance between the position of each pixel point and the position of the certain backlight source of the plurality of backlight sources in the case that only the certain backlight source is turned on includes: the diffusion luminance value and the diffusion distance of each of the pixel points at different distances from the position of the certain backlight source in an horizontal direction and a vertical direction. Of course, the pixel points at other positions may be selected. For example, all the pixel points in both the horizontal direction and the vertical direction may be selected, or a certain number of every other pixel points may be selected.

Step 120: preprocessing the light diffusion data to determine effective pixel points of the plurality of pixel points. Such preprocessing may include, for example, acquiring the diffusion range of the backlight source, where the data within the diffusion range is the effective pixel point data. The diffusion range may be an actual diffusion range of the backlight source. Alternatively, in order to remove invalid and useless data to reduce the calculation amount and made the calculation result more accurate, for example, it is able to removing the light diffusion data of the pixel points of which the luminance values are smaller than a first luminance threshold, and selecting the pixel points of which the luminance values are greater than or equal to the first luminance threshold as the effective pixel points. With the increasing of the distance from the backlight source, the diffusion luminance may be decreased accordingly. When the diffusion luminance is decreased to a certain degree, a total luminance may be influenced at a minor degree. For example, the first luminance threshold may be 3-5% of the luminance at the center of the backlight source, so as to acquire the diffusion range of a single backlight source. In addition, for the data of too low luminance far away from the backlight source, the luminance measurement may have a large error, and if such data is used for the subsequent function fitting process, the fitting result may not be accurate and the error may be large.

Figure 5:
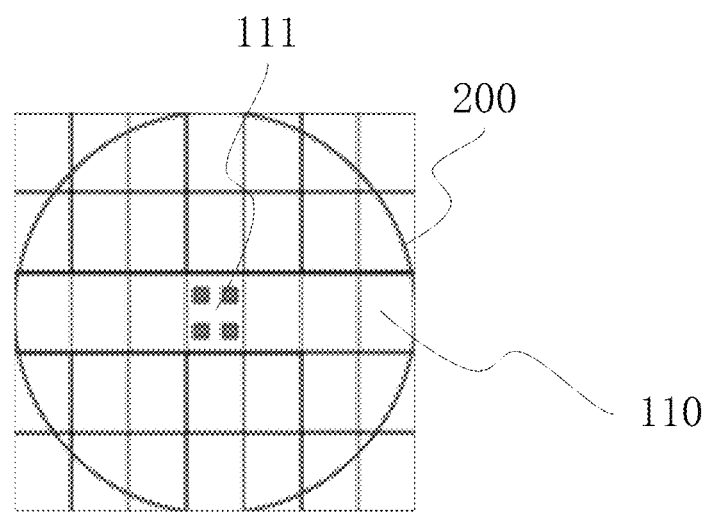
FIG. 5 is a schematic view of diffusion rang of a single backlight source in some embodiments of the present disclosure.

FIG. 5 is a schematic view of diffusion rang of a single backlight source in some embodiments of the present disclosure. As shown in FIG. 5, the diffusion range 200 of the backlight source 111 includes 7 backlight regions 110 in a horizontal direction and 5 backlight regions 110 in a vertical direction. It should be noted that, although the backlight transmission is isotropous, i.e., the diffusion range in different directions are the same, the backlight regions are not of a square shape in the case of different backlight circuits and display resolution ratios. Therefore, the backlight source may cover different numbers of backlight regions in different directions.

Step 130: fitting the light diffusion data of the effective pixel points, to obtain a point spread function y=ƒ(x) indicating a relationship between y representing a diffusion luminance value and x representing a diffusion distance, where y representing a diffusion luminance value is a luminance value of each pixel point, and x representing a diffusion distance is a distance between a position of the each pixel point and a position of a certain backlight source of the plurality of backlight sources.

According to the optical characteristic of the backlight source, the point spread function y=ƒ(x) is a polynomial function. In some embodiments of the present disclosure, a piecewise polynomial function is used to establish a point spread function model.

For example, the point spread function y=ƒ(x) is a piecewise polynomial function as:

$$f(x) = \begin{cases} \sum_{n=0}^{k} a_n x^n & 0 \leq x \leq d1 \\ \sum_{n=0}^{k} b_n x^n & d1 < x \leq d2 \end{cases}$$

where k represents a polynomial order, $a_n$ and $b_n$ represent coefficients of respective terms, d1 represents a decomposition distance of the piecewise polynomial function, d2 represents a maximum diffusion distance representing a distance between a backlight source and an effective pixel point farthest from the backlight source, x represents the diffusion distance, and y represents the diffusion luminance value. The d1 representing a decomposition distance of the piecewise polynomial function is determined based on a division of the backlight regions of the display device. For example, the decomposition distance d1 may be an integral multiple of the length of the backlight region in the horizontal direction or the vertical direction, or a half of the radius of the diffusion range or the like.

Alternatively, a spline function (e.g., a cubic spline function, B spline function) is used as the primary function to model the point spread function. The parameter fitting process is similar to the polynomial function, which those skilled in the art may realize according to the polynomial parameter fitting process provided in the present disclosure. According to the experimental result, the polynomial function may be closer to the actual distribution of the backlight source diffusion, and the fitting result thereof is better.

Step 140: determining the point spread function y=ƒ(x) as the backlight diffusion transmission parameter.

In order to acquire a more accurate result, the fitting the light diffusion data of the effective pixel points, to obtain the point spread function y=ƒ(x) indicating the relationship between y representing a diffusion luminance value and x representing a diffusion distance further includes: performing a statistic analysis to the light diffusion data of the effective pixel points, to obtain a mean value of the diffusion luminance values corresponding to each diffusion distance and determining the mean value as a mean diffusion luminance value of the each diffusion distance; and performing a curve-fitting to a relationship data of the mean diffusion luminance value and the each diffusion distance, to obtain the parameters of the point spread function y=ƒ(x).

In some embodiments of the present disclosure, one backlight source is selected from each of the backlight regions at 5 directions, and the data of the backlight source is acquired in the horizontal and vertical directions, so it is able to acquire 10 groups of light diffusion data. In theory, the diffusion of the backlight source is basically isotropic. From the analysis of experimental data, a relationship between the diffusion luminance and changing distance is basically the same in the horizontal and vertical directions, so it is able to select 5 groups of data in one direction as the data to be analyzed. In order to eliminate the random error, the 5 groups of data may be averaged to obtain a mean value thereof, then it is able to acquire a mean diffusion luminance value corresponding to the diffusion distance counted by the pixels, and the mean diffusion luminance value is taken as the data to be fit. By performing a curve-fitting to the mean diffusion luminance value, a corresponding point spread function may be acquired. Although the light is diffused smoothly in theory, the device and the external light may interfere with the measurement data and the data will be fluctuant. The curve-fitting process may be performed through the proven arithmetic in the related art, or the data may be processed by the tool software such as Matlab and Mathematica.

Figure 6:
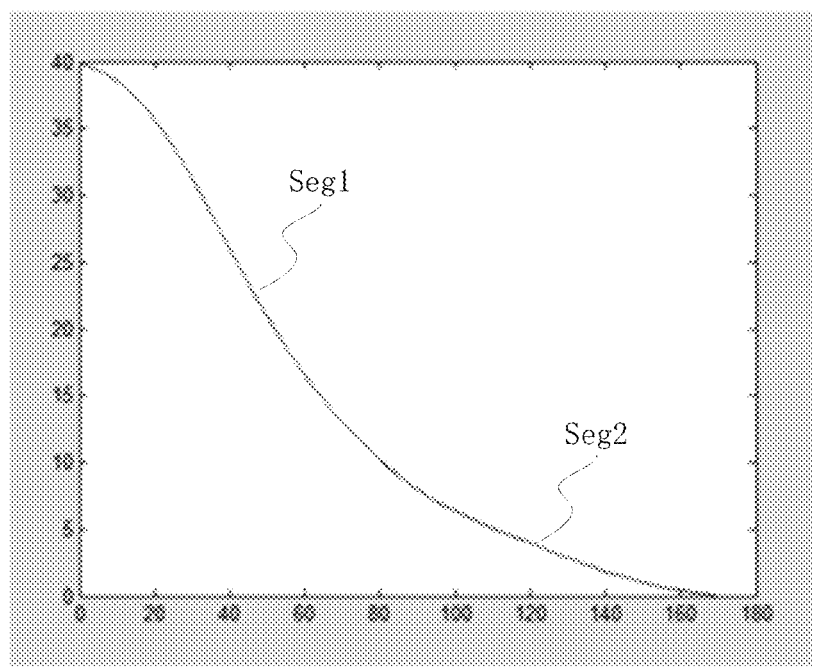
FIG. 6 is a schematic view of a curve-fitting result of a point spread function in some embodiments of the present disclosure.

FIG. 6 is a schematic view of a curve-fitting result of a point spread function in some embodiments of the present disclosure, where the vertical coordinate represents the unit luminance and the horizontal coordinate represents the pixel distance. The curve in FIG. 6 is fitted by Matlab, which shows a result of a SPF function fitting through a piecewise polynomial functions. It can be seen from FIG. 6, the fitting effects at Seg 1 and Seg 2 are good.

A method for detecting a backlight diffusion luminance is further provided in some embodiments of the present disclosure, including: determining, based on a distance between a position of a pixel point and each backlight source of a plurality of backlight sources and a backlight diffusion transmission parameter, a backlight diffusion luminance value of each backlight source at the position of the pixel point, where the backlight diffusion transmission parameter is acquired based on the method hereinabove.

Figure 7:
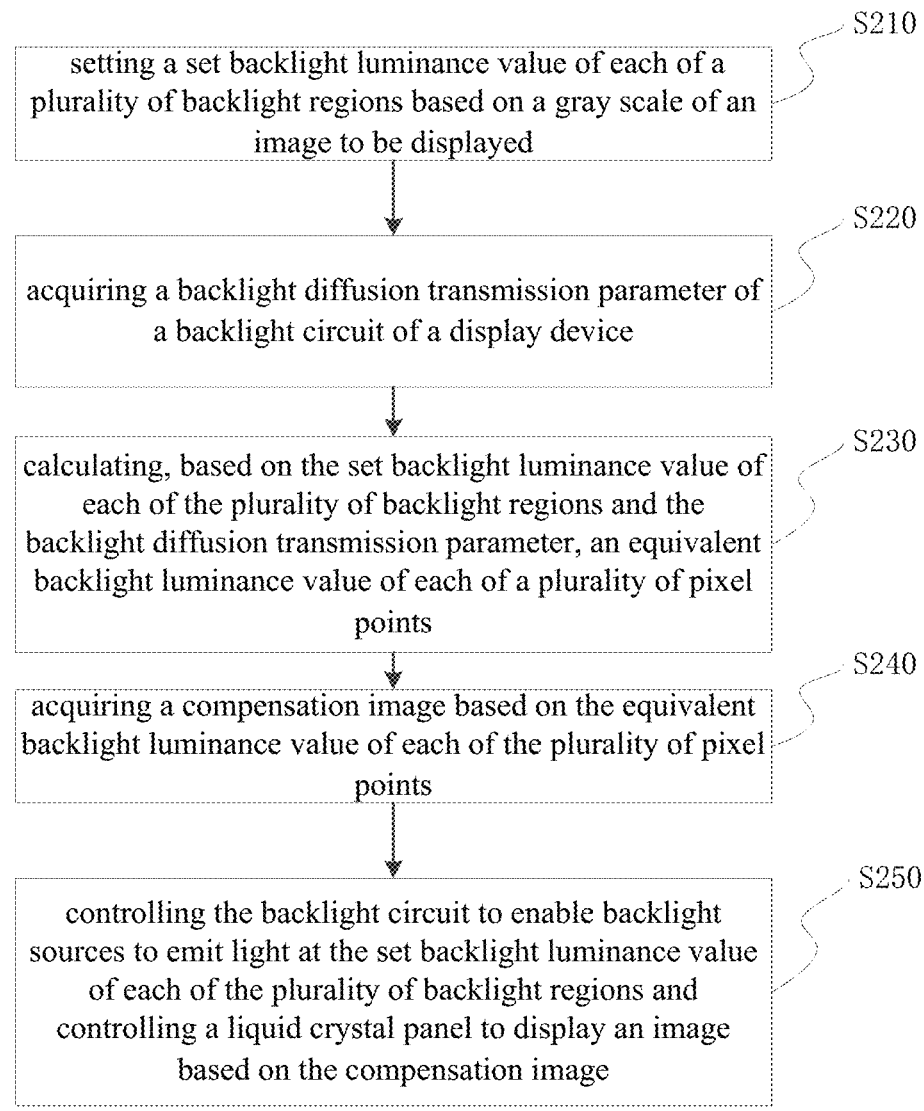
FIG. 7 is a flow chart of a display control method in some embodiments of the present disclosure.

According to the method for acquiring a backlight diffusion transmission parameter and the method for detecting a backlight diffusion luminance, it is able to model the diffusion of the backlight source precisely, thereby acquiring the light diffusion coefficient of a certain backlight source for the pixel at any distance from the certain backlight source. Therefore, it is able to calculate the equivalent backlight of each pixel point precisely in the local dimming process and then acquire the corresponding LCD compensation image, so as to achieve a better display effect than the full-backlight display. Next, a display control method through the above point spread function will be described in detail. FIG. 7 is a flow chart of a display control method in some embodiments of the present disclosure. The display control method includes Step 210 to Step 250.

Step 210: setting a set backlight luminance value of each of a plurality of backlight regions based on a gray scale of an image to be displayed. For example, set backlight luminance value of each backlight region may be determined based on a pixel gray scale statistic value of each backlight region. The display image has many gray scales, such as 8 levels and 256 gray scales. Generally, the adjustable levels of the backlight luminance cannot reach so many levels, so it is able to select a similar luminance level according to the section of the gray scale.

Step 220: acquiring a backlight diffusion transmission parameter of a backlight circuit of a display device. The backlight diffusion transmission parameter may be stored in the storage of the display device and called in the display control process, so as to implement the display control method.

Step 230: calculating, based on the set backlight luminance value of each of the plurality of backlight regions and the backlight diffusion transmission parameter, an equivalent backlight luminance value of each of a plurality of pixel points.

In some embodiments of the present disclosure, the backlight diffusion transmission parameter includes a point spread function $y=f(x)$ indicating a relationship between y representing a diffusion luminance value and x representing a diffusion distance.

To be specific, for each pixel point, it is able to acquire the equivalent backlight luminance calculation formula of the pixel points by the following steps including:

determining, through the point spread function $y=f(x)$, A×B effective backlight sources affecting a luminance of each pixel point of the plurality of pixel points, where A and B are positive integers, where the equivalent backlight luminance of each pixel point may be acquired through the effective range of the point spread function, for example, a pixel center may be determined based on the diffusion radius r, and all the backlight sources in the range with a radius r are taken as the effective backlight sources;

acquiring, through using the point spread function $y=f(x)$ based on a distance between the each pixel point and each of the A×B effective backlight sources, a total diffusion luminance value of the A×B effective backlight sources at the each pixel point and taking the total diffusion luminance value as the equivalent backlight luminance value $BL_{equ}$ of the each pixel point, where $$BL_{equ} = \sum_{i=1}^{A}\sum_{j=1}^{B} f(x_{i,j})L_{i,j},$$

where $x_{i,j}$ represents the distance between each pixel point and each of the A×B effective backlight sources, $f(x_{i,j})$ represents a diffusion weight of each of the A×B effective backlight sources for the each pixel point, and $L_{i,j}$ represents a luminance reference value of each of the A×B effective backlight sources, the luminance reference value is a dimensionless ratio of a backlight relative luminance, for example, the luminance reference value may be a ratio of the luminance of the backlight source and the maximum luminance of the backlight source, which may be determined based on the set backlight value in the local dimming process;

determining the A×B effective backlight sources of each pixel point and the diffusion weight of each of the A×B effective backlight sources for the each pixel point as the backlight diffusion transmission parameter and storing the backlight diffusion transmission parameter, and calculating the equivalent backlight luminance value of each of the plurality of pixel points, based on the A×B effective backlight sources of each pixel point, the diffusion weight of each of the A×B effective backlight sources for the each pixel point and the set backlight luminance value of each of the plurality of backlight regions.

In order to simplify the calculation, in some embodiments, assuming that the form of the point spread function do not change in the case that the backlight sources have different luminance, that is, for the luminance $L_{i,j}$ of different backlight sources, the diffusion weight $f(x_{i,j})$ thereof only relates to the distance $x_{i,j}$ rather than the luminance $L_{i,j}$.

In some embodiments of the present disclosure, the method further includes: performing a weighting normalization to a calculation formula of the equivalent backlight luminance value of each of the plurality of pixel points, where a formula of calculating a weigh sum is $$\text{sum\_weight} = \sum_{i=1}^{A}\sum_{j=1}^{B} f(x_{i,j}),$$

a formula of calculating a normalized weight is weight(i,j)= $f(x_{i,j})/\text{sum\_weight}$; and determining the normalized weight as the backlight diffusion transmission parameter and storing the backlight diffusion transmission parameter, to calculate equivalent backlight luminance value, without recalculating the weight every time.

Step 240: acquiring a compensation image based on the equivalent backlight luminance value of each of the plurality of pixel points, where after acquiring the equivalent backlight luminance of the pixel point, it is able to perform the corresponding LCD compensation to acquire a corresponding compensation image, and the calculation method of the LCD compensation image in the related art may be used herein;

Step 250: controlling the backlight circuit to enable backlight sources to emit light at the set backlight luminance value of each of the plurality of backlight regions and controlling a liquid crystal panel to display an image based on the compensation image;

The backlight diffusion transmission parameter of the backlight circuit of the display device is acquired based on the method hereinabove and stored in the display device. For example, the backlight diffusion transmission parameter may be acquired by testing each type of products by the manufacturer of the display device before delivery and stored in the storage of the display device, and called when needed. After acquiring the point spread function of the backlight circuit, the diffusion weight of each of the A X B effective backlight sources for the each pixel point may be calculated and stored. Furthermore, the normalized weight is calculated and stored, or acquired by the manufacturer of the display device before delivery.

In order to facilitate the understanding, the method generally includes:

(1) data acquisition: acquiring the light diffusion data of a plurality of pixel points;

(2) data preprocessing: acquiring the backlight diffusion range and the data of the effective pixel points;

(3) point spread function fitting: acquiring a point spread function by a function fitting based on the data of the effective pixel points;

(4) calculating the backlight diffusion weights of the pixel points based on the fitted point spread function, i.e., calculating the diffusion weights of all the effective backlight sources;

(5) performing a weighting normalization to the diffusion weights;

(6) acquiring the final backlight diffusion weights and storing the same.

In the local dimming process, it is required to adjust the backlight of each frame of image respectively (or every a few of frames of image, which is determined based on the control calculation method design). After each time of adjusting the backlight, the equivalent backlight luminance of each pixel point needs to be recalculated. Therefore, the calculation speed is very important. The A×B effective backlight sources, the corresponding diffusion weight data or the normalized weight data are stored, thereby significantly improving the calculation speed.

Figure 8:
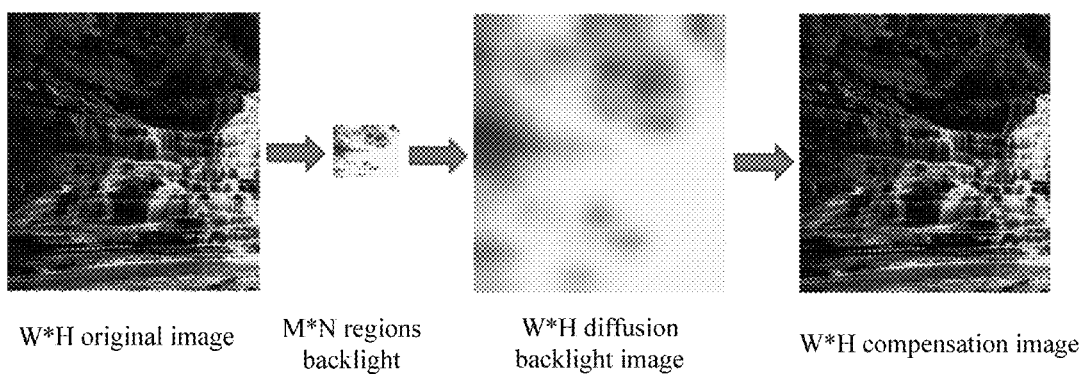
FIG. 8 is a schematic view of images displayed through a display control method in some embodiments of the present disclosure.

FIG. 8 is a schematic view of images displayed through a display control method in some embodiments of the present disclosure. For example, the resolution ratio of the image to be displayed is W×H, the backlight circuit has M×N regions. A statistic is performed to the backlight of the M×N regions to acquire a backlight set value pattern. The backlight display of the M×N regions is controlled based on the backlight set value, to acquire the equivalent backlight of each pixel, so as to acquire a W×H diffusion backlight image. The W×H compensation image is calculated based on the W×H diffusion backlight image. It can be seen that, for the region of which the backlight is darkened, the gray scale of the compensation image is increased, so the luminance is increased.

According to the display control method in the embodiments of the present disclosure, by modeling the diffusion of the backlight sources precisely and storing the diffusion weight of the effective backlight source of each pixel point, it is able to acquire the luminance diffusion coefficient of the backlight source to the pixel at any distance from the backlight source, thereby calculating the equivalent backlight of each pixel point precisely and rapidly, acquiring a smooth W×H backlight distribution similar to the actual backlight diffusion luminance, acquiring the corresponding LCD compensation image and achieving a better display effect than the full-backlight display. Therefore, the image within the non low gray scale range may be closer to the luminance of the original image, thereby reducing the image distortion. The image quality is good, the contrast is high, the distortion ratio is low, and there may not be blocks or boundary. In addition, the luminance of the darker region of the image is lowered, so it is able to have a better contrast.

Figure 9:
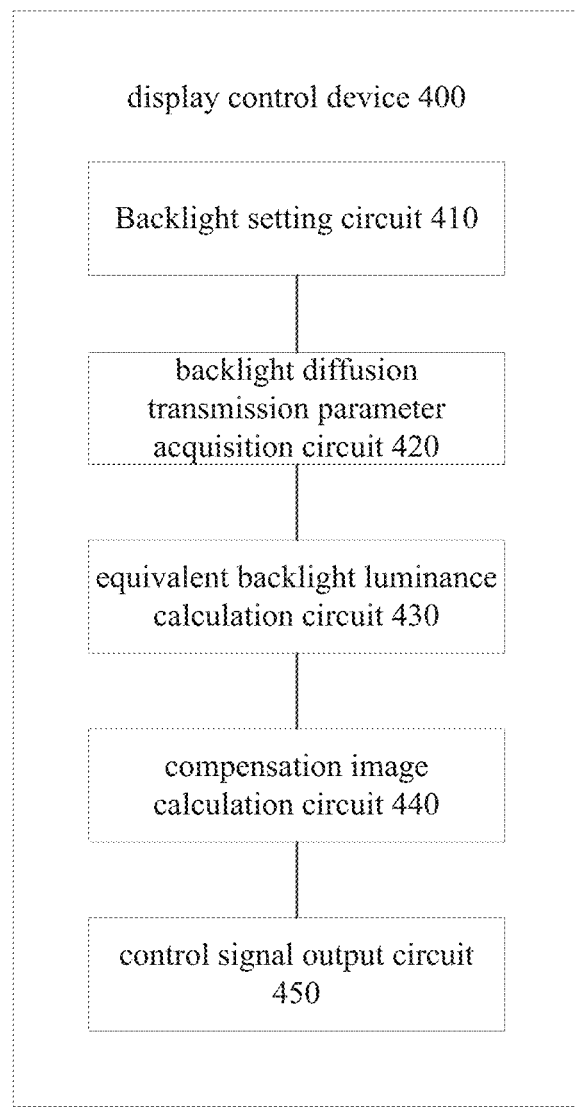
FIG. 9 is a schematic view of a display control device in some embodiments of the present disclosure.

A display control device is further provided in some embodiments of the present disclosure. FIG. 9 is a schematic view of a display control device in some embodiments of the present disclosure.

The display control device is applied to a direct-type backlight liquid crystal display device having a plurality of adjustable backlight regions and includes:

an image acquisition circuit, configure to acquire an image to be displayed;

a backlight setting circuit 410, configured to set a set backlight luminance value of each of the plurality of backlight regions based on a gray scale of the image to be displayed;

a backlight diffusion transmission parameter acquisition circuit 420, configure to acquire a backlight diffusion transmission parameter of a backlight circuit of a display device;

an equivalent backlight luminance calculation circuit 430, configured to calculate an equivalent backlight luminance value of each of a plurality of pixel points based on the set backlight luminance value of each of the plurality of backlight regions and the backlight diffusion transmission parameter;

the backlight diffusion transmission parameter includes a point spread function $y=f(x)$ indicating a relationship between y representing a diffusion luminance value and x representing a diffusion distance, and the equivalent backlight luminance calculation circuit 430 is further configured to:

determine, through the point spread function $y=f(x)$, A×B effective backlight sources affecting a luminance of each pixel point of the plurality of pixel points, where A and B are positive integers;

acquire, through using the point spread function $y=f(x)$ based on a distance between the each pixel point and each of the A×B effective backlight sources, a total diffusion luminance value of the A×B effective backlight sources at the each pixel point and take the total diffusion luminance value as the equivalent backlight luminance value $BL_{equ}$ of the each pixel point, where $$BL_{equ} = \sum_{i=1}^{A} \sum_{j=1}^{B} f(x_{i,j}) L_{i,j},$$

where $x_{i,j}$ represents the distance between the each pixel point and each of the A×B effective backlight sources, $f(x_{i,j})$ represents a diffusion weight of each of the A×B effective backlight sources for the each pixel point, and $L_{i,j}$ represents a luminance reference value of each of the A×B effective backlight sources;

determine the A×B effective backlight sources of each pixel point and the diffusion weight of each of the A×B effective backlight sources for the each pixel point as the backlight diffusion transmission parameter and store the backlight diffusion transmission parameter; and calculate the equivalent backlight luminance value of each of the plurality of pixel points, based on the A×B effective backlight sources of each pixel point, the diffusion weight of each of the A×B effective backlight sources for the each pixel point and the set backlight luminance value of each of the plurality of backlight regions.

Furthermore, the equivalent backlight luminance calculation circuit is further configured to:

perform a weighting normalization to the calculation formula of the equivalent backlight luminance value of each of the plurality of pixel points, where a formula of calculating a weigh sum is $$\text{sum\_weight} = \sum_{i=1}^{A} \sum_{j=1}^{B} f(x_{i,j}),$$

a formula of calculating a normalized weight is weight(i,j)= $f(x_{i,j})$/sum_weight; and determine the normalized weight as the backlight diffusion transmission parameter and store the backlight diffusion transmission parameter, to calculate equivalent backlight luminance value.

In addition, the device further includes:

a compensation image calculation circuit 440, configured to acquire a compensation image based on the equivalent backlight luminance value of each of the plurality of pixel points; and a control signal output circuit 450, configured to output a control signal to control the backlight circuit to enable backlight sources to emit light at the set backlight luminance value of each of the plurality of backlight regions and control a liquid crystal panel to display an image based on the compensation image;

where the backlight diffusion transmission parameter of the backlight circuit of the display device is acquired based on the method hereinabove and stored in the display device.

A display device is further provided in some embodiments of the present disclosure, including a direct-type backlight circuit, a display panel, a computer-readable storage medium and a processor, where the processor is configured to read a program stored in the computer readable storage medium to perform the display control method hereinabove.

According to the display control method in the embodiments of the present disclosure, by modeling the diffusion of the backlight sources precisely and storing the diffusion weight of the effective backlight source of each pixel point, it is able to acquire the luminance diffusion coefficient of the backlight source to the pixel at any distance from the backlight source, thereby calculating the equivalent backlight of each pixel point precisely and rapidly, acquiring a smooth W×H backlight distribution similar to the actual backlight diffusion luminance, acquiring the corresponding LCD compensation image and achieving a better display effect than the full-backlight display. Therefore, the image within the non low gray scale range may be closer to the luminance of the original image, thereby reducing the image distortion. The image quality is good, the contrast is high, the distortion ratio is low, and there may not be blocks or boundary. In addition, the luminance of the darker region of the image is lowered, so it is able to have a better contrast.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Obviously, a person skilled in the art may make further modifications and improvements without departing from the principle of the present disclosure, and these modifications and improvements shall also fall within the scope of the present disclosure.

What is claimed is:

1. A method for acquiring a backlight diffusion transmission parameter, comprising:

selecting a plurality of backlight sources respectively arranged at different backlight regions of a display device and measuring a light diffusion data for each of the plurality of backlight sources, wherein the light diffusion data comprises luminance values of a plurality of pixel points of a screen of the display device and a distance between a position of each pixel point and a position of a certain backlight source of the plurality of backlight sources in the case that only the certain backlight source is turned on;

preprocessing the light diffusion data to determine effective pixel points of the plurality of pixel points;

fitting the light diffusion data of the effective pixel points, to obtain a point spread function y=$f$(x) indicating a relationship between y representing a diffusion luminance value and x representing a diffusion distance, wherein y representing a diffusion luminance value is a luminance value of each pixel point, and x representing a diffusion distance is a distance between a position of the each pixel point and a position of a certain backlight source of the plurality of backlight sources; and determining the point spread function y=f(x) as the backlight diffusion transmission parameter;

wherein the preprocessing the light diffusion data to determine the effective pixel points of the plurality of pixel points further comprises:

removing the light diffusion data of the pixel points of which the luminance values are smaller than a first luminance threshold, and selecting the pixel points of which the luminance values are greater than or equal to the first luminance threshold as the effective pixel points.

2. The method according to claim 1, wherein the luminance values of the plurality of pixel points of the screen of the display device and the distance between the position of each pixel point and the position of the certain backlight source of the plurality of backlight sources in the case that only the certain backlight source is turned on comprises:

the diffusion luminance value and the diffusion distance of each of the pixel points at different distances from the position of the certain backlight source in an horizontal direction and a vertical direction.

3. The method according to claim 1, wherein the point spread function y=f(x) is a piecewise polynomial function as:

$$f(x) = \begin{cases} \sum_{n=0}^{k} a_n x^n & 0 \le x \le d1 \\ \sum_{n=0}^{k} b_n x^n & d1 < x \le d2 \end{cases}$$

wherein k represents a polynomial order, $a_n$ and $b_n$ represent coefficients of respective terms, d1 represents a decomposition distance of the piecewise polynomial function, d2 represents a maximum diffusion distance representing a distance between a backlight source and an effective pixel point farthest from the backlight source, x represents the diffusion distance, and y represents the diffusion luminance value.

4. The method according to claim 3, wherein the d1 representing a decomposition distance of the piecewise polynomial function is determined based on a division of the backlight regions of the display device.

5. The method according to claim 1, wherein the fitting the light diffusion data of the effective pixel points, to obtain the point spread function y=f(x) indicating the relationship between y representing a diffusion luminance value and x representing a diffusion distance further comprises:

performing a statistic analysis to the light diffusion data of the effective pixel points, to obtain a mean value of the diffusion luminance values corresponding to each diffusion distance and determining the mean value as a mean diffusion luminance value of the each diffusion distance; and performing a curve-fitting to a relationship data of the mean diffusion luminance value and the each diffusion distance, to obtain the point spread function y=f(x).

6. The method according to claim 1, wherein the position of each pixel point is a coordinate position of the each pixel point at the screen of the display device, and the position of the certain backlight source of the plurality of backlight sources is a coordinate position of the pixel point corresponding to a center point of the certain backlight source at the screen of the display device.

7. A display control method, comprising:

setting a set backlight luminance value of each of a plurality of backlight regions based on a gray scale of an image to be displayed;

acquiring a backlight diffusion transmission parameter of a backlight circuit of a display device;

calculating, based on the set backlight luminance value of each of the plurality of backlight regions and the backlight diffusion transmission parameter, an equivalent backlight luminance value of each of a plurality of pixel points;

acquiring a compensation image based on the equivalent backlight luminance value of each of the plurality of pixel points; and controlling the backlight circuit to enable backlight sources to emit light at the set backlight luminance value of each of the plurality of backlight regions and controlling a liquid crystal panel to display an image based on the compensation image;

wherein the backlight diffusion transmission parameter of the backlight circuit of the display device is acquired based on the method according to claim 1 and stored in the display device.

8. The method according to claim 7, wherein the calculating, based on the set backlight luminance value of each of the plurality of backlight regions and the backlight diffusion transmission parameter, the equivalent backlight luminance value of each of the plurality of pixel points further comprises:

determining, through the point spread function y=f(x), A×B effective backlight sources affecting a luminance of each pixel point of the plurality of pixel points, wherein A and B are positive integers;

acquiring, through using the point spread function y=f(x) based on a distance between the each pixel point and each of the A×B effective backlight sources, a total diffusion luminance value of the A×B effective backlight sources at the each pixel point and taking the total diffusion luminance value as the equivalent backlight luminance value $BL_{equ}$ of the each pixel point, wherein $$BL_{equ} = \sum_{i=1}^{A} \sum_{j=1}^{B} f(x_{i,j}) L_{i,j},$$

wherein $x_{i,j}$ represents the distance between each pixel point and each of the A×B effective backlight sources, $f(x_{i,j})$ represents a diffusion weight of each of the A×B effective backlight sources for the each pixel point, and $L_{i,j}$ represents a luminance reference value of each of the A×B effective backlight sources;

determining the A×B effective backlight sources of each pixel point and the diffusion weight of each of the A×B effective backlight sources for the each pixel point as the backlight diffusion transmission parameter and storing the backlight diffusion transmission parameter; and calculating the equivalent backlight luminance value of each of the plurality of pixel points, based on the A×B effective backlight sources of each pixel point, the diffusion weight of each of the A×B effective backlight sources for the each pixel point and the set backlight luminance value of each of the plurality of backlight regions.

9. The method according to claim 8, further comprising:
performing a weighting normalization to a calculation formula of the equivalent backlight luminance value of each of the plurality of pixel points, wherein a formula of calculating a weigh sum is $$\text{sum\_weight} = \sum_{i=1}^{A} \sum_{j=1}^{B} f(x_{i,j}),$$

a formula of calculating a normalized weight is weight(i,j)= $f(x_{i,j})$/sum_weight; and
determining the normalized weight as the backlight diffusion transmission parameter and storing the backlight diffusion transmission parameter, to calculate equivalent backlight luminance value.

10. A display control device applied to a direct-type backlight liquid crystal display device having a plurality of adjustable backlight regions, comprising:
an image acquisition circuit, configure to acquire an image to be displayed;
a backlight setting circuit, configured to set a set backlight luminance value of each of the plurality of backlight regions based on a gray scale of the image to be displayed;
a backlight diffusion transmission parameter acquisition circuit, configure to acquire a backlight diffusion transmission parameter of a backlight circuit of a display device;
an equivalent backlight luminance calculation circuit, configured to calculate an equivalent backlight luminance value of each of a plurality of pixel points based on the set backlight luminance value of each of the plurality of backlight regions and the backlight diffusion transmission parameter;
a compensation image calculation circuit, configured to acquire a compensation image based on the equivalent backlight luminance value of each of the plurality of pixel points; and
a control signal output circuit, configured to output a control signal to control the backlight circuit to enable backlight sources to emit light at the set backlight luminance value of each of the plurality of backlight regions and control a liquid crystal panel to display an image based on the compensation image;
wherein the backlight diffusion transmission parameter of the backlight circuit of the display device is acquired based on the method according to claim 1 and stored in the display device.

11. The device according to claim 10, wherein the backlight diffusion transmission parameter comprises a point spread function y=$f(x)$ indicating a relationship between y representing a diffusion luminance value and x representing a diffusion distance, and the equivalent backlight luminance calculation circuit is further configured to:
determine, through the point spread function y=$f(x)$, A×B effective backlight sources affecting a luminance of each pixel point of the plurality of pixel points, wherein A and B are positive integers;
acquire, through using the point spread function y=$f(x)$ based on a distance between the each pixel point and each of the A×B effective backlight sources, a total diffusion luminance value of the A×B effective backlight sources at the each pixel point and take the total diffusion luminance value as the equivalent backlight luminance value $BL_{equ}$ of the each pixel point, wherein $$BL_{equ} = \sum_{i=1}^{A} \sum_{j=1}^{B} f(x_{i,j}) L_{i,j}$$

wherein $x_{i,j}$ represents the distance between the each pixel point and each of the A×B effective backlight sources, $f(x_{i,j})$ represents a diffusion weight of each of the A×B effective backlight sources for the each pixel point, and $L_{i,j}$ represents a luminance reference value of each of the A×B effective backlight sources;
determine the A×B effective backlight sources of each pixel point and the diffusion weight of each of the A×B effective backlight sources for the each pixel point as the backlight diffusion transmission parameter and store the backlight diffusion transmission parameter; and
calculate the equivalent backlight luminance value of each of the plurality of pixel points, based on the A×B effective backlight sources of each pixel point, the diffusion weight of each of the A×B effective backlight sources for the each pixel point and the set backlight luminance value of each of the plurality of backlight regions.

12. The device according to claim 11, wherein the equivalent backlight luminance calculation circuit is further configured to:
perform a weighting normalization to the calculation formula of the equivalent backlight luminance value of each of the plurality of pixel points, wherein a formula of calculating a weigh sum is $$\text{sum\_weight} = \sum_{i=1}^{A} \sum_{j=1}^{B} f(x_{i,j}),$$

a formula of calculating a normalized weight is weight(i,j)= $f(x_{i,j})$/sum_weight; and
determine the normalized weight as the backlight diffusion transmission parameter and store the backlight diffusion transmission parameter, to calculate equivalent backlight luminance value.

13. A display device, comprising a direct-type backlight circuit, a display panel, a computer-readable storage medium and a processor, wherein the processor is configured to read a program stored in the computer readable storage medium to perform the display control method according to claim 7.

14. A method for detecting a backlight diffusion luminance, comprising:
determining, based on a distance between a position of a pixel point and each backlight source of a plurality of backlight sources and a backlight diffusion transmission parameter, a backlight diffusion luminance value of each backlight source at the position of the pixel point, wherein the backlight diffusion transmission parameter is acquired through the following steps:
selecting a plurality of backlight sources respectively arranged at different backlight regions of a display device and measuring a light diffusion data for each of the plurality of backlight sources, wherein the light diffusion data comprises luminance values of a plurality of pixel points of a screen of the display device and a distance between a position of each pixel point and a position of a certain backlight source of the plurality of backlight sources in the case that only the certain backlight source is turned on;

preprocessing the light diffusion data to determine effective pixel points of the plurality of pixel points;

fitting the light diffusion data of the effective pixel points, to obtain a point spread function $y=f(x)$ indicating a relationship between y representing a diffusion luminance value and x representing a diffusion distance, wherein y representing a diffusion luminance value is a luminance value of each pixel point, and x representing a diffusion distance is a distance between a position of the each pixel point and a position of a certain backlight source of the plurality of backlight sources; and determining the point spread function $y=f(x)$ as the backlight diffusion transmission parameter;

wherein the preprocessing the light diffusion data to determine the effective pixel points of the plurality of pixel points further comprises:

removing the light diffusion data of the pixel points of which the luminance values are smaller than a first luminance threshold, and selecting the pixel points of which the luminance values are greater than or equal to the first luminance threshold as the effective pixel points.

* * * * *